US012006763B2

(12) United States Patent
Hengstenberg et al.

(10) Patent No.: US 12,006,763 B2
(45) Date of Patent: Jun. 11, 2024

(54) RAIL VEHICLE DOOR

(71) Applicant: SIEMENS MOBILITY GMBH, Munich (DE)

(72) Inventors: Thomas Hengstenberg, Groebenzell (DE); Herbert Kammerloher, Biburg (DE); Thomas Wimberger, Freising (DE)

(73) Assignee: Siemens Mobility GmbH, Munich (DE)

( * ) Notice: Subject to any disclaimer, the term of this patent is extended or adjusted under 35 U.S.C. 154(b) by 986 days.

(21) Appl. No.: 16/966,647

(22) PCT Filed: Feb. 5, 2019

(86) PCT No.: PCT/EP2019/052691
§ 371 (c)(1),
(2) Date: Jul. 31, 2020

(87) PCT Pub. No.: WO2019/154771
PCT Pub. Date: Aug. 15, 2019

(65) Prior Publication Data

US 2020/0362620 A1 Nov. 19, 2020

(30) Foreign Application Priority Data

Feb. 6, 2018 (DE) ..................... 10 2018 201 764.6

(51) Int. Cl.
*B61D 19/02* (2006.01)
*E06B 3/70* (2006.01)
*E06B 5/16* (2006.01)

(52) U.S. Cl.
CPC ................ *E06B 5/16* (2013.01); *B61D 19/02* (2013.01); *E06B 3/7015* (2013.01);
(Continued)

(58) Field of Classification Search
CPC ....... E06B 2003/7023; E06B 2003/704; E06B 2003/7042; E06B 3/7015; E06B 5/16; B61D 19/02
See application file for complete search history.

(56) References Cited

U.S. PATENT DOCUMENTS 1,725,931 A * 8/1929 Perkins ..................... E06B 5/16 52/404.1
3,039,525 A 6/1962 Starr
(Continued)

FOREIGN PATENT DOCUMENTS

CN 1527984 A 9/2004
CN 201196001 Y 2/2009
(Continued)

OTHER PUBLICATIONS

Schakhowa W. N. et al; "Kharakteristika materialow, primenjajemykh dlja wnetrennej otdelki pomeschtschenij paneljami"; Politransportnyje sistemy: M-ly VIII Mezhdunarodnoj nautschno-tekhnitscheskoj konferenzii w ramkakh goda nauki Rossija—ES Nautschnyje problemy realisazii transportnykh projektow w Sibiri i nächstliegende Analogielösung Dalnem Wostoke; Nowosibirsk; Izd-wo SGUPSa; 2015; pp. 66-69—English abstract on p. 67.
(Continued)

*Primary Examiner* — Scott A Browne
(74) *Attorney, Agent, or Firm* — Laurence A. Greenberg; Werner H. Stemer; Ralph E. Locher

(57) ABSTRACT

A door for rail vehicle has a frame-type door main body and covering metal sheets. The door main body is formed of profiled elements, which are connected to each other by way of corner connectors. The covering metal sheets are arranged on two opposite sides of the door main body. The profiled elements are connected to each other exclusively by way of a fixed but releasable connection by the corner connectors. A fire protection material is arranged between at least one
(Continued)

covering metal sheet and the frame-type door main body in such a way that the fire resistance and the thermal insulation of the rail vehicle door are increased.

9 Claims, 3 Drawing Sheets

(52) U.S. Cl.
CPC . *E06B 2003/7023* (2013.01); *E06B 2003/704* (2013.01); *E06B 2003/7042* (2013.01)

(56) References Cited

U.S. PATENT DOCUMENTS

| | | | | |
|---|---|---|---|---|
| 6,530,183 | B1 * | 3/2003 | Kuei-Yung | E06B 1/70<br>49/504 |
| 8,151,616 | B2 | 4/2012 | Isomaeki | |
| 9,243,444 | B2 * | 1/2016 | Daniels | E06B 5/164 |
| 9,963,923 | B2 | 5/2018 | Jetzinger et al. | |
| 11,377,128 | B2 * | 7/2022 | Hengstenberg | B61D 23/00 |
| 11,498,594 | B2 * | 11/2022 | Hengstenberg | B60J 1/007 |
| 11,618,484 | B2 * | 4/2023 | Hengstenberg | B61D 19/02<br>105/343 |
| 2003/0014322 | A1 | 1/2003 | Kreidler et al. | |
| 2007/0095570 | A1 * | 5/2007 | Roberts | H05K 9/0001<br>174/543 |

FOREIGN PATENT DOCUMENTS

| | | | | |
|---|---|---|---|---|
| CN | 201400178 | Y | * | 2/2010 |
| CN | 201400178 | Y | | 2/2010 |
| CN | 202413809 | U | | 9/2012 |
| CN | 103255988 | A | | 8/2013 |
| CN | 205805344 | U | | 12/2016 |
| CN | 205876045 | U | | 1/2017 |
| CN | 206091785 | U | | 4/2017 |
| CN | 206220809 | U | | 6/2017 |
| DE | 2114109 | A1 | | 10/1972 |
| DE | 20019242 | U1 | | 1/2001 |
| DE | 102007010903 | A1 | | 9/2008 |
| DE | 102010033983 | A1 | | 2/2012 |
| DE | 102012107422 | A1 | | 2/2014 |
| EP | 0008401 | A1 | | 3/1980 |
| EP | 0318455 | A1 | | 5/1989 |
| FR | 1231191 | A | | 9/1960 |
| KR | 101723565 | B1 | * | 4/2017 |
| RU | 2270311 | C2 | | 2/2006 |
| RU | 124919 | U1 | | 2/2013 |
| WO | 2007020319 | A1 | | 2/2007 |

OTHER PUBLICATIONS

Yang Jianguo, "Building Decoration Materials", 2014, pp. 52-54—English abstract.

* cited by examiner

RAIL VEHICLE DOOR

BACKGROUND OF THE INVENTION

Field of the Invention

The invention relates to a door of a rail vehicle.

It is known practice to construct doors of a rail vehicle using individually manufactured, metallic extruded profiles.

For this purpose, a frame-type door basic body is formed from parts of the extruded profile. The extruded profiles are welded to one another at abutment edges, with corner pieces additionally being provided for stabilization at corners of the door basic body and likewise being welded to the extruded profiles.

On two opposite sides of the door basic body there are arranged metallic covering sheets which form corresponding door leaves. The covering metal sheets bear substantially flat against the extruded profiles of the door basic body and are connected thereto by screwing or crimping techniques.

Owing to the small piece numbers of rail vehicle doors, the use of individually manufactured extruded profiles results in high costs.

The connection of the individual door elements by welding techniques necessitates a high manufacturing and finishing outlay and also a welding qualification and welding certification for the operating company, and thus likewise high costs.

The flat connection between the covering metal sheets and the extruded profiles of the door basic body results in a relatively good thermal conductivity such that, in the event of a fire, the door has a short fire resistance duration and poor thermal insulation.

SUMMARY OF THE INVENTION

It is therefore an object of the present invention to specify a door for a rail vehicle that can be manufactured cost-effectively on the one hand and that has an improved fire resistance duration or improved thermal insulation on the other hand.

This object is achieved by the features of the claims.

Advantageous developments of the invention are specified by the features of the dependent claims.

The rail vehicle door according to the invention has a frame-type door basic body and covering metal sheets. The door basic body consists of profiles which are connected to one another by way of corner connectors. Covering metal sheets are arranged on two opposite sides of the door basic body. The profiles are connected to one another exclusively by way of a fixed, but releasable connection by way of the respective corner connectors. A fire protection material is arranged between at least one covering metal sheet and the frame-type door basic body in such a way that the fire resistance and the thermal insulation of the rail vehicle door are increased.

The fire protection material used is preferably gypsum board.

The rail vehicle door according to the invention dispenses with the use of individually manufactured and expensive extruded profiles. Instead, use is advantageously made of customary and therefore inexpensive rectangular hollow profiles whose dimensions are already known and have been introduced, and are available, in the market virtually as standard.

The rail vehicle door according to the invention dispenses with the use of elaborately shaped and therefore expensive corner connectors. Instead, use is advantageously made of metal sheets which can be flat or bent depending on the intended application.

Use is preferably made of flat metal sheets which have been produced by means of a laser-cutting method. Such methods allow a high degree of accuracy in the produced workpiece combined with tolerable production costs.

The rail vehicle door according to the invention dispenses with the use of welding methods for connecting individual door elements. Instead, the individual components are connected to one another fixedly, but releasably, for example by means of screw or rivet connections. As a result, the production costs of the rail vehicle door are again reduced.

The avoidance of using welding methods advantageously also avoids finishing work on the door elements, thus additionally saving on labor time and thus costs. Such work includes for example a hitherto necessary realignment and post-machining of door elements (for example of the welded, frame-type door basic body), and grinding of weld seams, etc.

The use of thick-walled fire protection material creates large-area, thermal insulating surfaces between the frame-type door basic body and the covering metal sheets of the door surface. Consequently, the fire resistance duration of the rail vehicle door is significantly increased.

By virtue of the offset arrangement of stiffening transverse struts in the rail vehicle door or in the frame-type door basic body, any heat bridges and consequences thereof are reduced and the thermal insulation between the door elements is advantageously increased.

The present invention will be explained in more detail below by way of example with reference to some figures, in which:

DETAILED DESCRIPTION OF THE INVENTION

Figure 1:
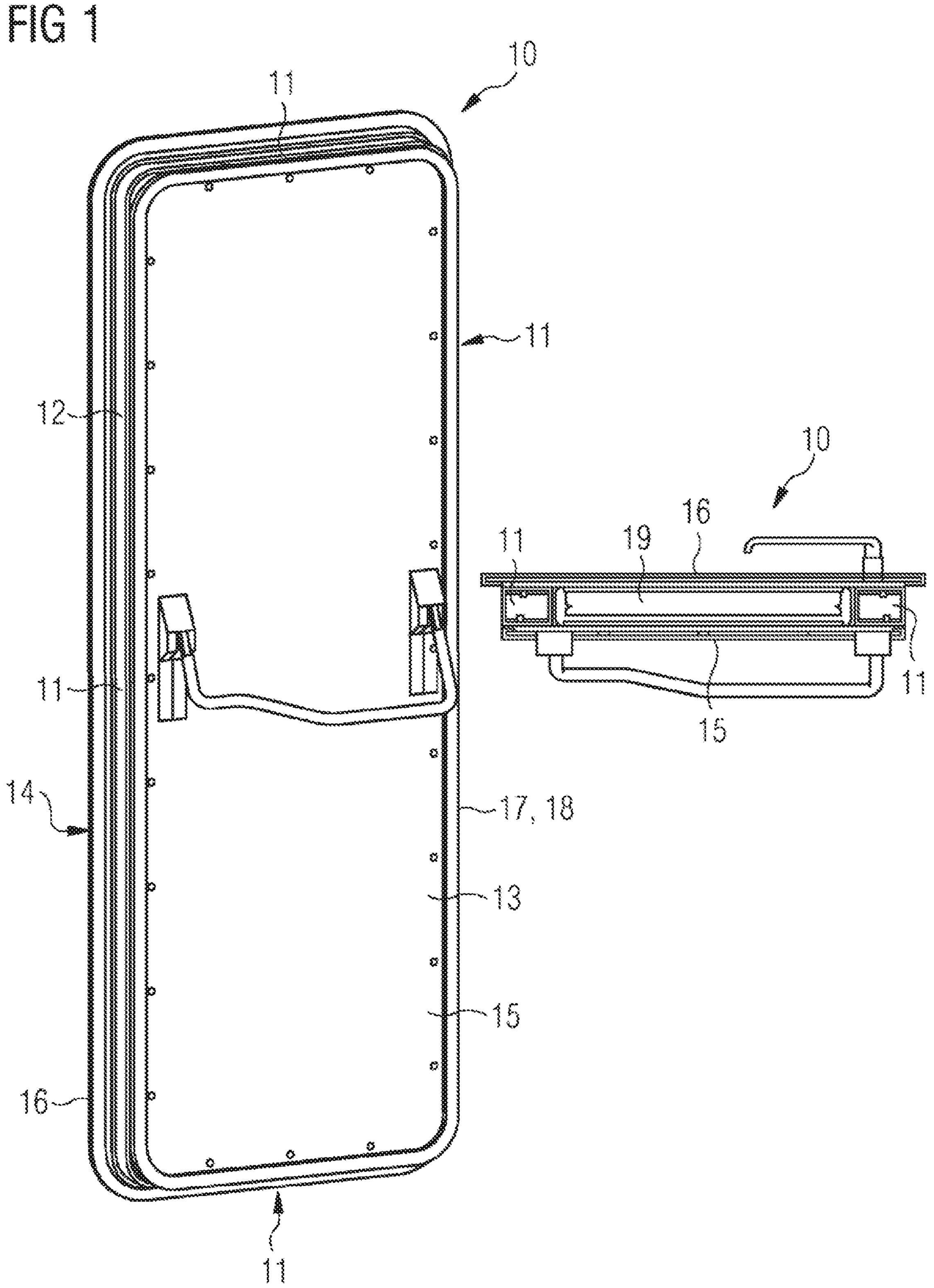
FIG. 1 shows the rail vehicle door according to the invention in a perspective view and in a plan view.

FIG. 1 shows the rail vehicle door 10 according to the invention in a perspective view and in a plan view in sectional illustration.

Four profiles 11 are connected to one another at their respective corners and form a frame-type door basic body 12 which is used as a carrying structure.

Covering metal sheets 15, 16 are arranged on two opposite sides 13, 14 of the door basic body 12 and are connected to the door basic body 12 or to its profiles 11.

The rail vehicle door 10 has a peripheral edge 17 along which there is arranged a material 18 which foams in the event of a fire, in particular an intumescent material. This prevents smoke passage into spaces which adjoin the rail vehicle door 10.

Empty spaces 20 of the frame-type door basic body 12 are filled with fire protection material 19.

The fire protection material 19 used is preferably gypsum board.

Figure 2:
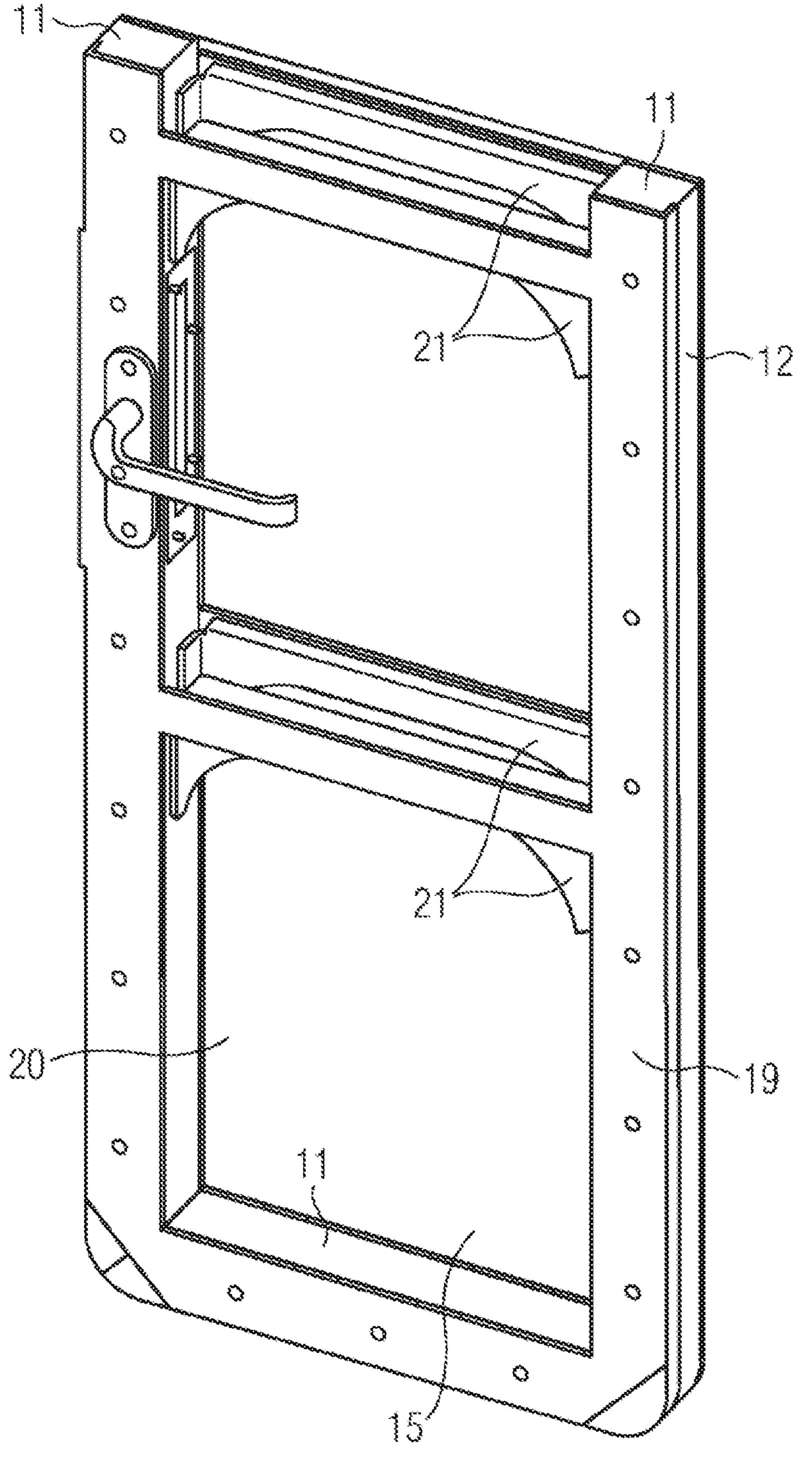
FIG. 2 shows an illustration of individual elements of the rail vehicle door according to the invention.

FIG. 2 shows an illustration of individual elements of the rail vehicle door 10 according to the invention.

There can be seen here three of the profiles 11 which are connected to one another at their corners by way of special corner connectors (cf. in this respect the following figures) and without using welding techniques.

The profile 11 used is preferably a market-standard and thus cost-effective rectangular hollow profile.

The frame-type door basic body 12 includes stiffening transverse struts 21 which are preferably arranged offset from one another in such a way that any heat conduction between the transverse struts 21 is reduced and thus the thermal insulation of the rail vehicle door is increased.

Empty spaces 20 of the frame-type door basic body 12 can additionally be filled with fire protection material 19 (not shown here).

Fire protection material 19, preferably in strip form, is arranged between at least one covering metal sheet 15, 16 and the frame-type door basic body 12.

The fire protection material 19 used is preferably gypsum board.

The large-area arrangement of the fire protection material 19 achieved thereby improves the fire resistance of the rail vehicle door 10 and its thermal insulation.

Figure 3:
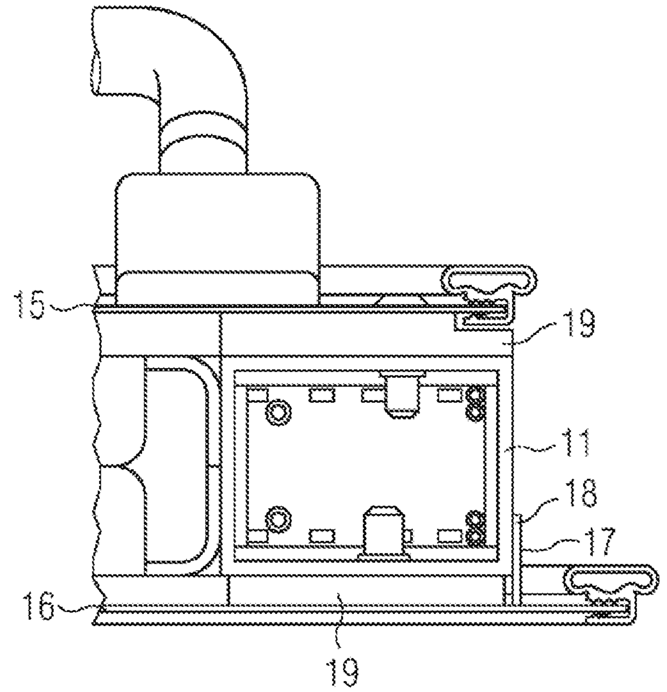
FIG. 3 shows, with reference to FIG. 1 and FIG. 2, a detail of the rail vehicle door according to the invention in cross section.

FIG. 3 shows, with reference to FIG. 1 and FIG. 2, a detail of the rail vehicle door 10 according to the invention in cross section.

Figure 4:
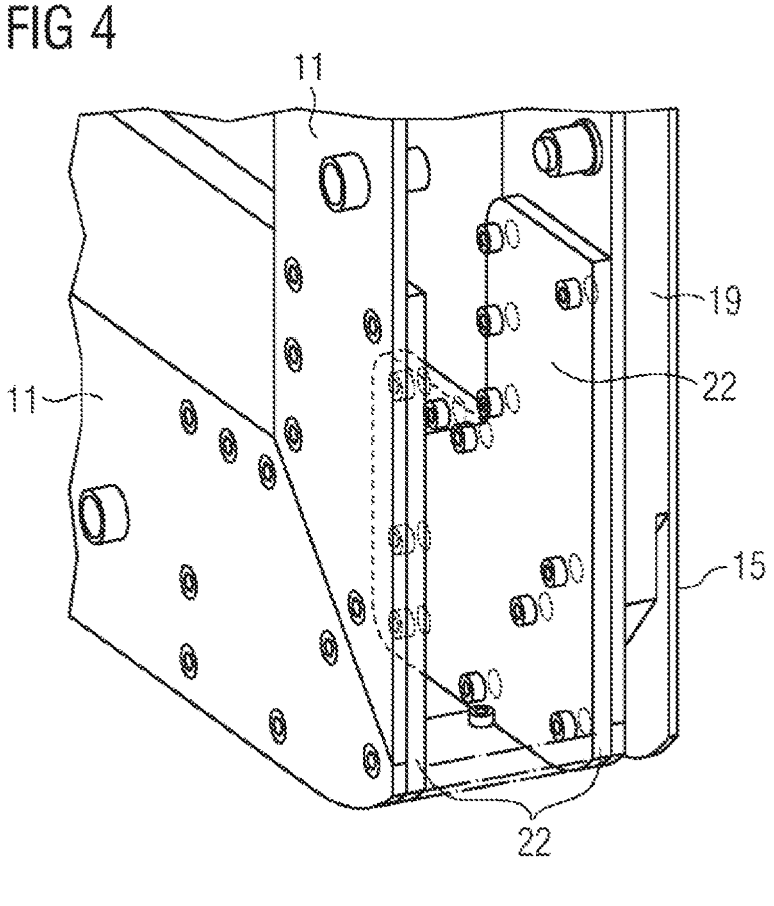
FIG. 4 shows, with reference to FIG. 1 and FIG. 2, a detail of the rail vehicle door according to the invention in cross section.

FIG. 4 shows, with reference to FIG. 1 and FIG. 2, a detail of the rail vehicle door 10 according to the invention in cross section.

It can be seen here how two profiles 11 are connected to one another exclusively by way of a fixed, but releasable connection by way of an associated, respective corner connector 22.

The corner connector 22 is preferably manufactured from one or more metal sheets or optionally as a casting and connects the two profiles 11 by means of a preferably cost-effective rivet connection or other releasable connection.

The corner connector 22 is preferably cut into shape by means of a laser and therefore has only minimum tolerances.

LIST OF REFERENCE SIGNS

10 Rail vehicle door
11 Profiles
12 Door basic body
13 A first side of the door basic body
14 A second side of the door basic body
15 Covering metal sheet
16 Covering metal sheet
17 Peripheral edge
18 Foaming material
19 Fire protection material
20 Empty space
21 Transverse strut
22 Corner connector

The invention claimed is:

1. A rail vehicle door, comprising:

a frame forming a door basic body, said door basic body being formed of profiles that are connected to one another by way of corner connectors;

said door basic body formed of said frame further including a plurality of stiffening transverse struts offset from one another in a direction defining a thickness of the door;

covering metal sheets disposed on two opposite sides of said door basic body;

said profiles being connected to one another exclusively by way of a fixed, but releasable connection by respective said corner connectors, each of said corner connectors being flat; and fire protection material arranged between at least one of said covering metal sheets and said door basic body for increasing a fire resistance and a thermal insulation of the rail vehicle door;

said fire protection material being gypsum board arranged areally over a large area between said covering metal sheet and said door basic body.

2. The rail vehicle door according to claim 1, wherein said corner connectors are manufactured from metal sheets.

3. The rail vehicle door according to claim 2, wherein said corner connectors are laser-cut shapes of metal sheets.

4. The rail vehicle door according to claim 1, wherein said fixed, but releasable connection configured to connect said profiles and said corner connectors is a rivet connection or a screw connection.

5. The rail vehicle door according to claim 1, wherein empty spaces of said door basic body are filled with said fire protection material.

6. The rail vehicle door according to claim 1, further comprising a material which foams in the event of a fire arranged along a peripheral edge of the door.

7. The rail vehicle door according to claim 6, wherein said material which foams in the event of a fire is an intumescent material.

8. The rail vehicle door according to claim 1, wherein said profile is a rectangular hollow profile.

9. The rail vehicle door according to claim 1, wherein said at least one covering metal sheet is connected to said door basic body by way of said fire protection material.

* * * * *